May 21, 1968  L. C. CHOUINGS  3,384,206
INTERNAL SHOE DRUM BRAKES

Filed Aug. 30, 1966  2 Sheets-Sheet 1

INVENTOR
Leslie C. Chouings
BY Lawrence J. Winter
ATTORNEY

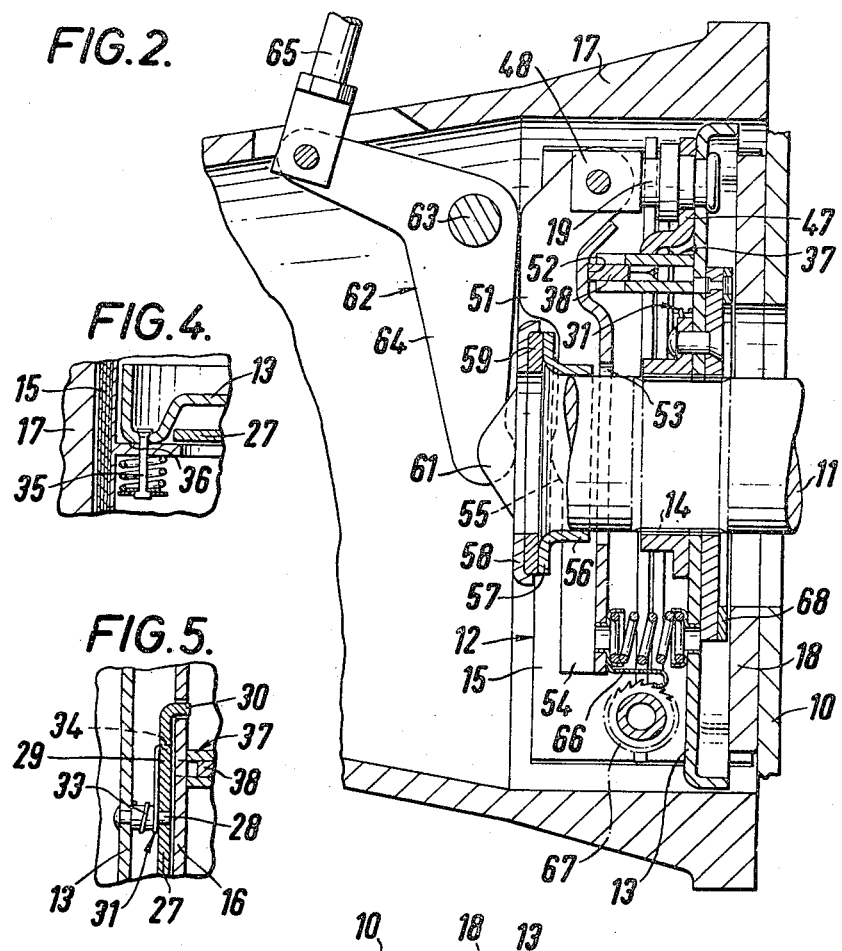

United States Patent Office 3,384,206
Patented May 21, 1968

3,384,206
INTERNAL SHOE DRUM BRAKES
Leslie C. Chouings, Warwickshire, England, assignor to Automotive Products Company Limited, Warwickshire, England
Filed Aug. 30, 1966, Ser. No. 576,122
Claims priority, application Great Britain, Sept. 20, 1965, 39,944/65
5 Claims. (Cl. 188—80)

ABSTRACT OF THE DISCLOSURE

The present invention relates to an internal shoe drum brake with a stationary drum and a brake assembly having a rotatable shaft with the brake assembly rotatably disposed on the shaft and axially slidable on the shaft. The brake assembly has a shoe carrier with mounted brake shoes on the carrier and an anchor pin connecting one end of the shoes together and a connecting member connecting the opposite ends of the shoes together. There are shoe expanding means to move the shoes into engagement with the shoe drum including a link extending between the shoes with the opposite ends engaging the shoes and a bell crank lever pivoted to the link for movement in a plane normal to the plane of movement of the shoes. A thrust member is provided to actuate a lever means operatively connected to the bell crank to cause the shoes to expand and effect the braking application.

---

This invention relates to internal shoe drum brakes, and has for its object to provide a brake which is particularly suitable for use on tractors and like vehicles.

According to the invention, an internal shoe drum brake comprises a stationary drum and a brake assembly rotatable with but axially slidable on a rotatable shaft, said brake assembly comprising a shoe carrier, shoes mounted on said carrier, counterbalancing means to prevent movement of the said shoes into engagement with the drum under centrifugal force, shoe expanding means and lever means to actuate said shoe expanding means, thrust means movable axially of said clutch to operate said lever means, and a stationary abutment aaginst which the brake assembly is urged by the axial thrust effecting the brake application.

The brake shoes may co-operate with an anchor pin at one pair of their adjacent ends, the said shoes being pivotally connected at their other pair of adjacent ends to a connecting member so that they constitute the primary and secondary shoes of a two-shoe servo arrangement, the connections being such that the shoes are restrained against relative outward movement at their connected ends.

The invention is hereinafter described with reference to the accompanying drawings, in which:

FIGURE 2 is a sectional elevation on the line 2—2 of FIGURE 1;

Figure 1:
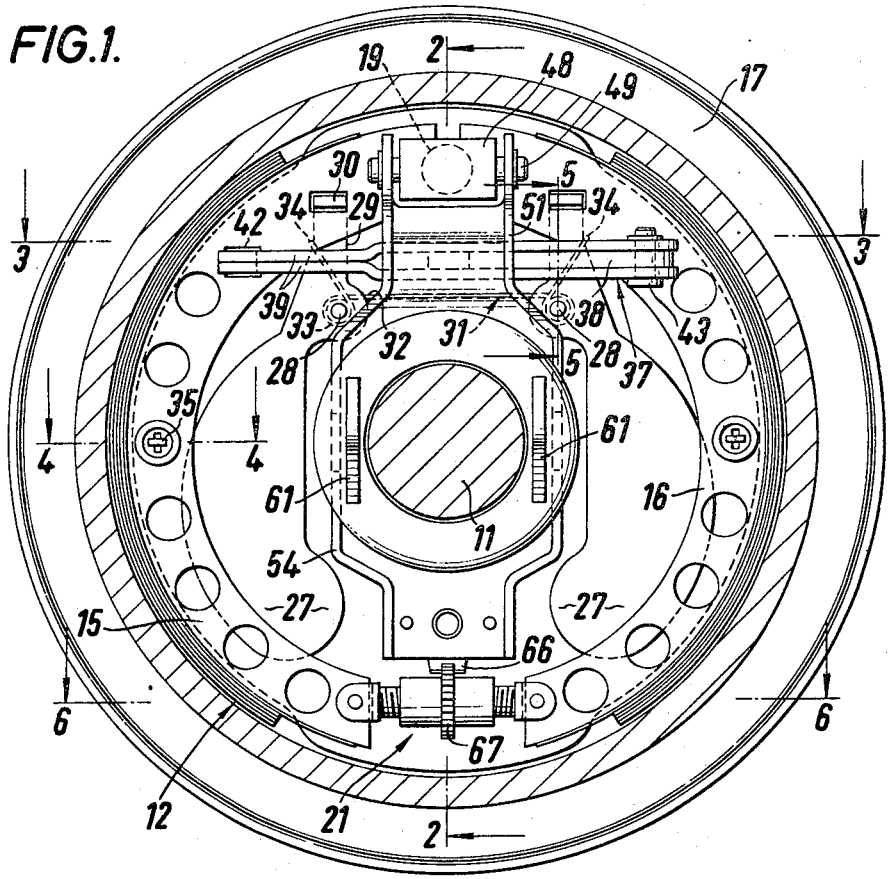
FIGURE 1 is a front elevation of one form of internal shoe drum brake in accordance with the invention.

FIGURES 4, 5 and 6 are detail views taken on the lines 4—4, 5—5 and 6—6 respectively in FIGURE 1.

Referring to the drawings, which show a brake according to the invention for use on a tractor the said brake acts on a shaft projecting from the transmission housing of the tractor, the shaft being driven with the land wheels of the tractor so that it rotates with the said wheels. Part of the transmission housing is shown at 10 in FIGURE 3, the shaft being shown at 11. A brake assembly, generally indicated by the reference 12, includes a brake shoe support 13 which is mounted on splines at 14 on the shaft 11, so that it is rotatable with the said shaft but is slidable axially thereon. Shoes 15 and 16 mounted on the support 13 cooperate with a brake drum 17 rigidly secured to the tractor structure, the drum enclosing the projecting shaft end and brake assembly. A flat annular metal plate 18 surrounding the shaft 11 is fixed to the outer face of the transmission housing 10 to provide an axial abutment for the brake assembly, as will be hereinafter described.

An anchor pin 19 is fixed to the shoe support 13 adjacent its periphery, and the brake shoes 15 and 16 each include a web having an arcuate notch at one end to engage the anchor pin 19. The brake shoes 15 and 16 are connected together at their opposite ends by a connecting member 21 of adjustable length, the connecting member 21 comprising a tubular body 22 (FIGURE 6) formed internally with right- and left-hand screw threads engaging with two screw-threaded tappets 23 and 24 each having a slotted head to receive the end of the web of one of the brake shoes. Pins 25 passing through holes in the tapped heads and in the brake shoe webs provide pivotal connections, the pins 25 having heads 26 (FIGURE 6) which engage the shoe support 13 to locate the shoes and connecting member against movement in the direction of the brake axis.

A pair of counterweights 27 each pivoted on the shoe support by means of pins 28, are formed with tail pieces 29 on the opposite side of their pivots to the weights themselves lugs 30 on the tail-pieces engaging in slots in the shoe webs adjacent the ends of the shoes which engage the anchor pin 19. The counterweights are so arranged that they tend to swing outwardly under centrifugal force when the brake assembly rotates, and thus oppose outward movement of the shoes under centrifugal force. A spring 31 having a central portion 32 extending between the pivot pins 28, coiled portions 33 surrounding the said pivot pins, and end portions 34 hooked to the tail-pieces 29, acts through the said tail-pieces to urge the ends of the brake shoes 15 and 16 inwardly into engagement with the anchor pin 19.

The shoes 15 and 16 are also located against movement in the direction of the brake axis by spring-loaded steady pins 35 holding the shoe webs against surfaces 36 on the shoe support 13, which surfaces 36, as shown in FIGURE 4 are offset from the general plane of the said shoe support.

Figure 3:
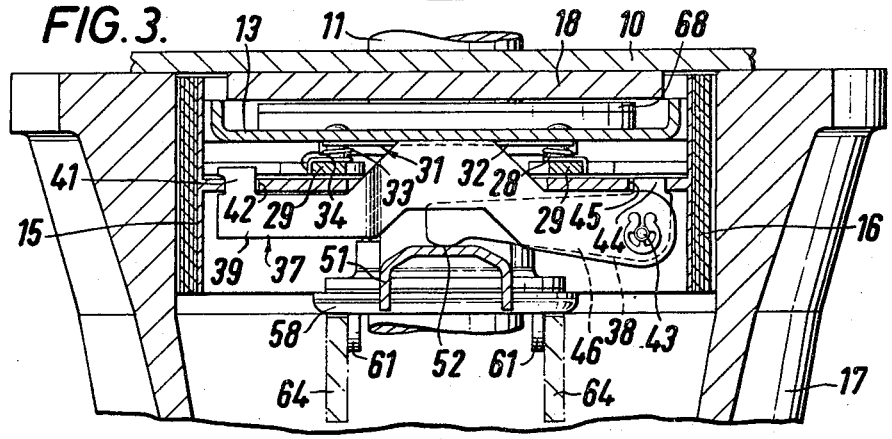
FIGURE 3 is a sectional plane on the line 3—3 of FIGURE 1.

The shoe expanding means for the brake comprises a link 37 and a bell-crank lever 38, the link 37, which consists of two metal strips 39 cranked intermediate their ends as shown in FIGURE 1 so that they lie against each other at one end and are spaced at the other end, having a hook formation 41 at its end where the metal strips are close together, which hook formation engages in an opening 42 (FIGURE 3) in the shoe 15, and extends transversely of the brake so that its other end overlies the web of the shoe 16. The bell crank lever 38 is positioned between the spaced portions of the strips 39 and is pivoted to them at its elbow, at 43, one arm 44 thereof engaging in an opening 45 in the web of the shoe 16, and the other arm 46 extending across the brake assembly to a diameter of the latter passing through the anchor pin 19. The shoe expanding means, as shown in FIGURES 1 and 2, is located adjacent the ends of the shoes 15 and 16 which cooperate with the anchor pin 19 and, as shown in FIGURE 2, is held against movement towards the anchor pin under the action of centrifugal force by the edge of a cranked plate 47 secured to the shoe support 13 by the anchor pin 19. The metal strips 39 forming the link 37 are shaped as shown in FIGURE 3 to enable the said link to be supported at its centre on the shoe support 13.

The anchor pin 19 is formed with a head 48 of generally rectangular shape to which is pivoted, by means of a pin 49, a lever 51 extending diametrally across the brake assembly and engaging, at 52, with the arms 46 of the bell-crank lever 38, the lever 51 being movable in a plane normal to both the plane of the shoe support 13 and the plane of the bell-crank lever 38. The lever 51 has an opening 53 through which the shaft 11 passes and is formed at its longitudinal edges with flanges 54 on its side away from the brake shoe support 13, the flanges 54 being formed with convexly curved projections 55 which lie substantially on a diameter of the brake support perpendicular to the centre line of the lever 51. A thrust ring 56 slidable on and rotatable with the shaft 11 has a flange 57 which engages the projections 55. Another ring 58, slidable on the shaft 11 but not rotatable therewith, carries an annular facing 59 of material having a low coefficient of friction with the thrust ring 56 and adapted to engage the flange of the said thrust ring, the ring 58 being formed, on its side opposite to the annular facing 59, with two parallel chordal ribs 61. A bell-crank lever 62 (FIGURE 2), pivoted at 63 in the brake drum 17, has one of its arms 64 forked to engage the ring 58 on the outer sides of the ribs 61, so that the said ribs engage with the furcations of the lever to prevent rotation of the ring 58.

The other arm of the bell-crank lever 62 is coupled by a thrust rod 65 or by other suitable linkage to a brake control pedal or lever (not shown) to be operated by the driver of the vehicle.

The lever 51 carries, at its end remote from its pivot, a spring pawl 66 which, as shown in FIGURE 2, cooperates with a ratchet wheel 67 fixed on the sleeve 22 of the connecting member 21, the arrangement being such that, when the lever 51 is moved to apply the brake, the pawl 66 rides idly over the teeth of the ratchet wheel 67 but, if the movement is sufficient to cause the pawl 66 to pass over one or more teeth of the ratchet wheel, the said pawl rotates the ratchet wheel and sleeve when the brake is released, thus increasing the length of the connecting member 21 and so reducing the clearance between the brake shoes and the drum.

There is mounted on the brake shoe support 13 a facing ring 68 which, when the brake is applied, is pressed by the axial thrust on the brake assembly against the disc 18 on the transmission housing to support the said thrust, the coefficient of friction of the said facing ring 68 with the disc 18 being so low that no appreciable drag is applied to the brake assembly and no substantial degree of heat is produced by the rubbing contact between the ring 68 and the disc 18.

To apply the brake, the bell-crank lever 62 is moved anti-clockwise as seen in FIGURE 2, pressing the ring 58 against the ring 56 which in turn moves the lever 51 about its pivot at 49 to apply a load to the arm 46 of the bell-crank lever 38. The said bell-crank lever 38 tends to rotate about its pivot at 43 on the link 37 to thrust the shoe 16 outwardly, the reaction to such outward thrust being transmitted through the link 37 to the shoe 15 which therefore also tends to move outwardly. The shoes 15 and 16 are thus applied to the drum 17, and the drag exerted on them by rotation of the drum urges one of them away from the anchor pin 19 whilst urging the other against the anchor pin. Since the connecting member 21 provides a thrust connection between the shoes, the shoe which is urged away from the anchor pin acts as the primary shoe of a two-shoe servo combination and increases the braking torque exerted by the other shoe, which acts as the secondary shoe of the combination.

It will be understood that other arrangements of brake shoes may be provided, for example a leading-and-trailing shoe combination or a two-leading-shoe combination, the shoe expanding means and the adjusting means being suitably modified.

I claim:

1. An internal shoe drum brake comprising a stationary drum and a brake assembly, a rotatable shaft, said brake assembly being rotatably disposed on said shaft and axially slidable thereon, said brake assembly including a shoe carrier, with brake shoes mounted on said carrier, an anchor pin disposed against one end of said shoes and connected to said shoes, a connecting member disposed adjacent the opposite ends of said shoes and pivotally connected thereto to provide a primary and a secondary shoe of a two-shoe servo arrangement, said connector member being disposed to prevent relative outward movement of the brake shoes at said opposite ends, counterbalancing means connected to said shoes to prevent movement of the shoes into engagement with said shoe drum by centrifugal force, shoe expanding means to move said shoes into engagement with said drum including a link extending between said two shoes with means at one end to engage one shoe, and a bell crank lever pivoted to the other end of the link, said bell crank lever being pivoted to the other end of said link and disposed for movement in a plane normal to the plane of movement of said shoes, said bell crank having one arm in engagement with the other shoe and the other bell crank arm extending to a diameter of the brake assembly about which said shoes are symmetrically disposed lever means operatively engaging said other bell crank arm to actuate said bell crank arm, thrust means movable axially of said shaft to operate said lever means, and a stationary abutment against which said brake assembly is urged by the axial thrust effecting the brake application including an annular surface on said abutment, and said shoe carrier has a facing ring mounted on it cooperating with said surface to dissipate heat generated by braking.

2. An internal shoe drum brake of claim 1, wherein the lever means comprise a lever pivotally mounted on the shoe carrier for movement in a plane normal to the plane of said shoe carrier, and said lever is pivotally mounted adjacent said anchor pin and the lever extends diametrically across the brake assembly.

3. An internal shoe drum brake of claim 2, wherein the thrust means comprise a ring slidably mounted on the shaft and rotatable therewith, and a second non-rotatable ring slidable on the shaft, and means provided to urge said second ring towards the brake support to operate said extending means.

4. An internal shoe drum brake of claim 3, wherein said connecting member comprises a sleeve formed with internal right- and left-hand threads at its opposite ends and screw-threaded tappets engaged in the opposite ends of said sleeve, the shoes being pivotally connected to the said tappets.

5. An internal shoe drum brake of claim 4, wherein said lever means carries a pawl cooperating with a ratchet wheel on the sleeve of said connecting member to provide automatic adjustment of the length of said connecting member due to the angular movement of said lever means.

References Cited

UNITED STATES PATENTS

| 1,887,377 | 11/1932 | McEwen | 192—106 X |
| 2,864,468 | 12/1958 | Dombeck | 188—80 X |
| 3,047,099 | 7/1962 | Dahle | 188—78 |

DUANE A. REGER, *Primary Examiner.*